United States Patent [19]

Miyazaki

[11] Patent Number: 4,766,599
[45] Date of Patent: Aug. 23, 1988

[54] COMMUNICATION SYSTEM WITH VARIABLY REPEATED TRANSMISSION OF DATA BLOCKS

[75] Inventor: Shinichi Miyazaki, Tokyo, Japan

[73] Assignee: NEC Corporation, Tokyo, Japan

[21] Appl. No.: 900,922

[22] Filed: Aug. 27, 1986

[30] Foreign Application Priority Data

Aug. 28, 1985 [JP] Japan .................................. 60-189037
Oct. 31, 1985 [JP] Japan .................................. 60-245407

[51] Int. Cl.⁴ .............................................. H04L 1/08
[52] U.S. Cl. ......................................... 375/8; 371/32; 371/69; 375/40
[58] Field of Search ....................... 371/30, 32, 33, 69; 375/8, 34, 40, 58, 100; 455/50, 52, 63, 73

[56] References Cited

U.S. PATENT DOCUMENTS 3,344,353 9/1967 Wilcox .................................. 371/69
4,422,171 12/1983 Wortley et al. ...................... 371/32
4,551,842 11/1985 Segarra ................................. 371/69

Primary Examiner—Benedict V. Safourek
Attorney, Agent, or Firm—Sughrue, Mion, Zinn, Macpeak & Seas

[57] ABSTRACT

In a communication system, the intensity and/or signal-to-noise ratio of a radio frequency signal received from a distant station is detected and a series of copies of the same data is generated. To improve the transmission efficiency under favorable conditions while minimizing errors under unfavorable conditions, the number of such copies is rendered variable in accordance with the detected intensity and/or signal-to-noise ratio, so that under unfavorable conditions the same data block is repeated in a greater number to correct errors and under favorable conditions it is repeated in a smaller number of reduce the transmission time.

7 Claims, 1 Drawing Sheet

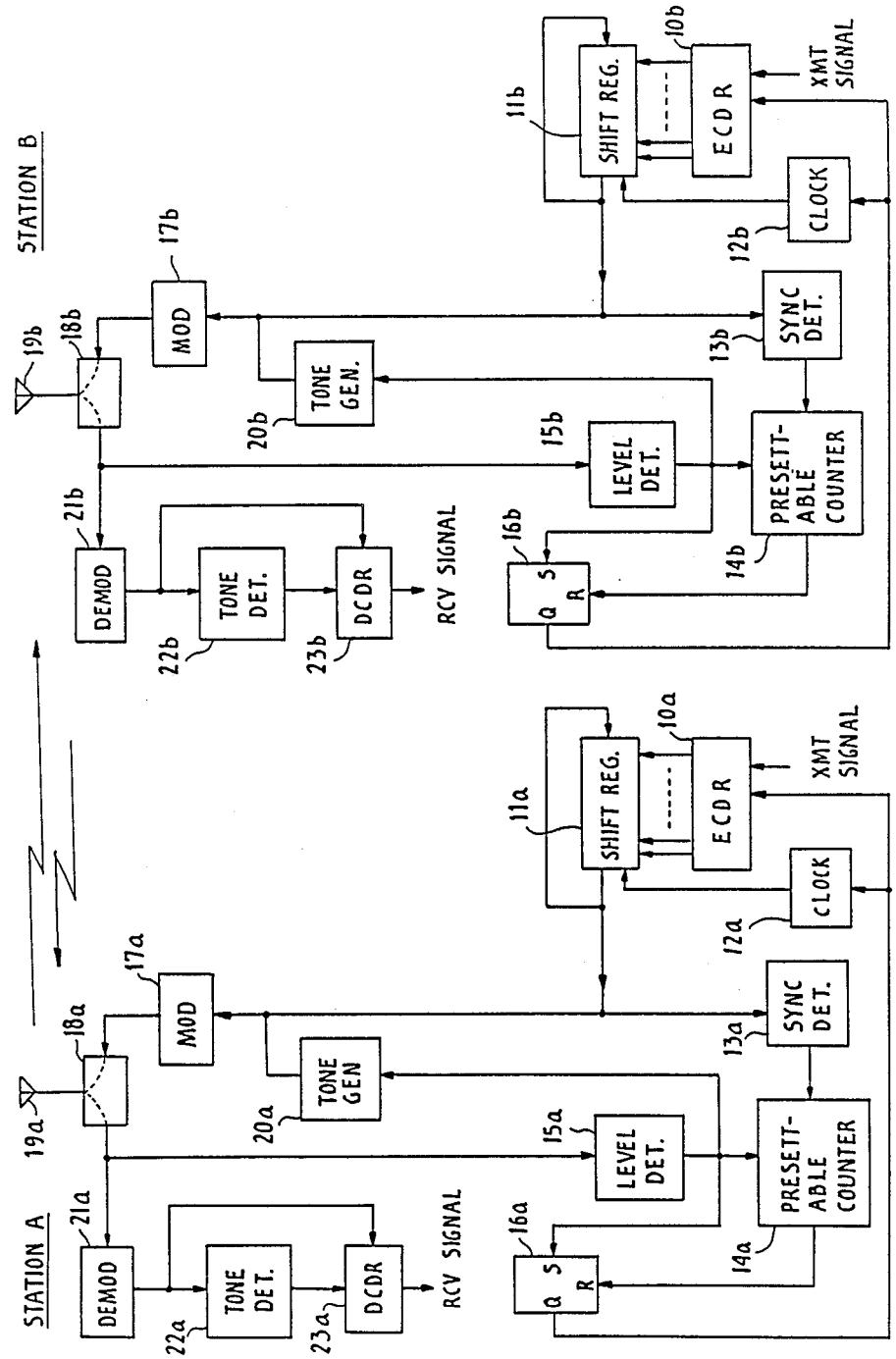

COMMUNICATION SYSTEM WITH VARIABLY REPEATED TRANSMISSION OF DATA BLOCKS

BACKGROUND OF THE INVENTION

The present invention relates to a communication system of the type wherein a data block is repeatedly sent to a distant station in order to minimize the effect of transmission errors.

A conventional radio communication system employs a technique whereby a data block is repeatedly transmitted to minimize the effect of transmission errors. However, the number of repetitions is constant. Thus, the number of repetitions may be insufficient under severely unfavorable conditions and may be excessively large under favorable conditions resulting in a low transmission efficiency.

SUMMARY OF THE INVENTION

It is therefore an object of the present invention to constantly monitor signal reception quality at a receiving station and to transmit thereto a series of copies of the same message signal, wherein the number of copies in the series is variable in accordance with the detected signal reception quality.

Preferably, a generator is provided to transmit a control signal indicative of the number of copies of a message signal contained in a single transmission immediately prior to each of the copies of the message signal to allow the receiver station to analyze each of the copies of the same message signal.

BRIEF DESCRIPTION OF THE DRAWING

The present invention will be described in further detail with reference to the accompanying drawing in which a block diagram of a data transmission system according to an embodiment of the present invention is illustrated.

DETAILED DESCRIPTION

For purposes of illustration, the data transmission system of the invention comprises radio stations, or transceivers A and B of identical construction. The circuit blocks that constitute the transceivers A and B are designated by numerals with characters "a" and "b" appended thereto to respectively indicate transceivers A and B, and wherein corresponding parts are designated by same numerals. Because of the same construction, description is concerned only with the transceiver A. Transceiver A comprises a data encoder 10a which receives a signal to be transmitted to transceiver B from a source, not shown, and translates it into a series of digital data blocks preceded by a frame sync. The data block generated by the encoder 10a is transferred in parallel to a shift register 11a which is shifted in response to a clock pulse from a clock source 12a. The data block stored into the shift register 11a is recirculated through it to transmit the same data block. The number of copies of the data block contained in each series is determined by the quality of signal reception from station B. This determination is made by a circuit including a sync detector 13a, a presettable counter 14a and a signal quality detector, or level detector 15a. Level detector 15a has its input connected to the receive end of a duplexer 18a through which a signal intercepted by an antenna 19a is applied. The field intensity level and/or signal-to-noise ratio of the intercepted signal is determined by the detector 15a. Detector 15a supplies the preset input of counter 14a with a control signal representative of the detected field intensity level and/or signal-to-noise ratio so that the counter 14a is preset to a count value which is inversely proportional to the detected field intensity or signal-to-noise ratio. Therefore, the preset count value represents the magnitude by which the quality of a radio frequency signal A sent from station B has been adversely affected during transmission. Sync detector 13a is connected to the output of shift register 11a to supply a pulse to the counter 14a in response to the detection of a frame sync, so that counter 14a is incremented each time a given data block is repeatedly generated by the shift register 11a. A flip-flop 16a is provided which is set in response to the detection of the intensity level by the level detector 15a. This flip-flop is reset when the counter 14a reaches its preset value. Thus, flip-flop 16a is at a high output state for a longer period for weak signals and for a shorter period for strong signals. Clock source 12a and encoder 10a are enabled during the high output state of flip-flop 16a, so that the same data block is generated in a greater number of repetitions for lower levels of a signal received from station B and in a smaller number of repetitions for higher levels of the signal.

Further included is a tone generator 20a which generates a tone signal whose frequency is variable as a function of the output of the detector 15a. This tone signal is combined with the output of shift register 11a so that it precedes a series of copies of the data block. The combined signal is modulated on a carrier by a modulator 17a and fed through the duplexer 18a to the antenna 19a and transmitted to the station B.

The signal intercepted by antenna 19a is also applied to a demodulator 21a where the original tone signal and digital data blocks are recovered and simultaneously fed to a tone detector 22a and a data decoder 23a. Tone detector 22a analyzes the frequency of the recovered tone signal and supplies the decoder 23a with a digital signal representative of the number of copies of the same data block contained in a single transmission to allow station A to repeat data analysis as often as required. Decoder 23a provides translation of the digital signal in a process inverse to that of the encoder 10a to recover the original analog signal from each data block sent from station B and the process is repeated in accordance with the number of repetitions.

With a varying intensity of signals intercepted by the antenna 19a, a greater number of copies of the same message can be sent under unfavorable conditions to minimize errors and a smaller number of copies may be sent under favorable conditions to improve transmission efficiency.

The foregoing description shows only a preferred embodiment of the present invention. Various modifications are apparent to those skilled in the art without departing from the scope of the present invention which is only limited by the appended claims. For example, the tone generator may be replaced with a circuit that generates a digital control signal representative of the output of the detector 15a. Therefore, the embodiment shown and described is only illustrative, not restrictive.

What is claimed is:

1. A radio transceiver comprising:
   first means for receiving signals from a distant station and constantly detecting reception quality;

second means for generating a series of copies of a message signal, a number of copies in said series being variable as a function of said detected reception quality;

third means for transmitting said series of copies to said distant station;

fourth means, operable during a transmit mode, for generating a control signal representative of the number of said copies contained in said series and causing said third means to transmit said control signal to said distant station immediately prior to the transmission of said series of copies; and fifth means, operable during a receive mode, for analyzing each of said copies received from said distant station in accordance with said control signal and varying said number of copies accordingly.

2. A radio transceiver as claimed in claim 1, wherein said first means comprises means for detecting an intensity of said received signals and said second means comprises means for varying the number of said copies contained in said series inversely as a function of the detected intensity.

3. A radio transceiver comprising:

first means for receiving signals from a distant station and constantly detecting reception quality;

second means for generating a series of copies of a message signal and encoding each of said copies into a digital data block to produce a series of copies of said digital data block, a number of said copies of said digital data block being variable as a function of said detected reception quality;

third means for transmitting said copies of said digital data block to a distant station;

fourth means, operable during a transmit mode, for generating a control signal representative of the number of said copies of said digital data block in said series and causing said third means to transmit said control signal to said distant station immediately prior to the transmission of said copies of digital data blocks; and fifth means, operable during a receive mode, for decoding each of said copies of said digital data block received from said distant station in accordance with said control signal.

4. A communication system comprising:

a first station including:

first means for receiving signals from a second station and constantly detecting reception quality of signals transmitted by said second station;

second means for generating a series of copies of a first message signal, a number of said copies of said first message signal being variable in accordance with said reception quality of signals transmitted by said second station;

third means for transmitting said series of said copies of said first message signal to said second station means, operable during a transmit mode of said first station, for generating a first control signal representative of the number of said copies of said first message signal and causing said third means to transmit said first control signal to said second station immediately prior to the transmission of said copies of said first message signal to said second station; and means, operable during a receive mode of said first station, for analyzing each of said copies of said second message signal from said second station in accordance with a second control signal, and said second station including:

fourth means for receiving signals from said first station and constantly detecting reception quality of signals transmitted by said first station;

fifth means for generating a series of copies of said second message signal, a number of copies of said second message signal being variable in accordance with said detected reception quality of signals transmitted by said first station;

sixth means for transmitting said copies of said second message signal to said first station;

means, operable during a receive mode of said second station, for generating said second control signal representative of the number of said copies of said second message signal and causing said sixth means to transmit said second control signal to said first station immediately prior to the transmission of said copies of said second message signal to said first station; and means, operable during a transmit mode of said second station, for analyzing each of said copies of said first message signal from said first station in accordance with said first control signal.

5. A data communication system as claimed in claim 4, wherein said first means comprises means for detecting an intensity of a radio frequency signal transmitted from said second station, and wherein said second means comprises means for generating said series of copies of said first message signal, said number of said copies of said first message signal being variable in inverse proportion to the intensity of said radio frequency signal transmitted from said second station.

6. A data communication system as claimed in claim 4, wherein said fourth means comprises means for detecting an intensity of a radio frequency signal transmitted from said first station, and wherein said fifth means comprises means for generating said series of copies of said second message signal, said number of said copies of said second message signal being variable in inverse proportion to the intensity of said radio frequency signal transmitted from said first station.

7. A communication system comprising:

a first station including:

first means for receiving signals from a second station and constantly detecting reception quality of signals transmitted by said second station;

second means for generating a first series of copies of a first digital data block, a number of said copies of said first digital data block being variable in accordance with said reception quality of signals transmitted by said second station;

third means for transmitting said first series of said copies of said first digital data block to said second station;

means for generating a first control signal representative of the number of said copies of said first digital data block contained in said first series and causing said third means to transmit said first control signal to said second station immediately prior to the transmission of said copies of said first digital data block to said second station; and means for decoding each of a series of copies of a second digital data block transmitted from said second station in accordance with a second control signal; and said second station including:

fourth means for receiving signals from said first station and constantly detecting reception quality of signals transmitted by said first station;

fifth means for generating said second series of copies of said second digital data block, a number of copies of said second digital data block contained in said second series being variable in accordance with said detected reception quality of signals transmitted by said first station;

sixth means for transmitting said copies of said second message signal to said first station;

means for generating said second control signal representative of the number of said copies of said second digital data block contained in said second series and causing said sixth means to transmit said second control signal to said first station immediately prior to the transmission of said copies of said second digital data block to said first station; and means for decoding each of said copies of said first digital data block transmitted from said first station in accordance with said first control signal.

* * * * *